Jan. 11, 1949.                    C. W. MANN                    2,458,953
                     APPARATUS AND METHOD FOR DETERMINING
Filed Feb. 24, 1947        THE SCUFF RESISTANCE OF LEATHER        3 Sheets-Sheet 1
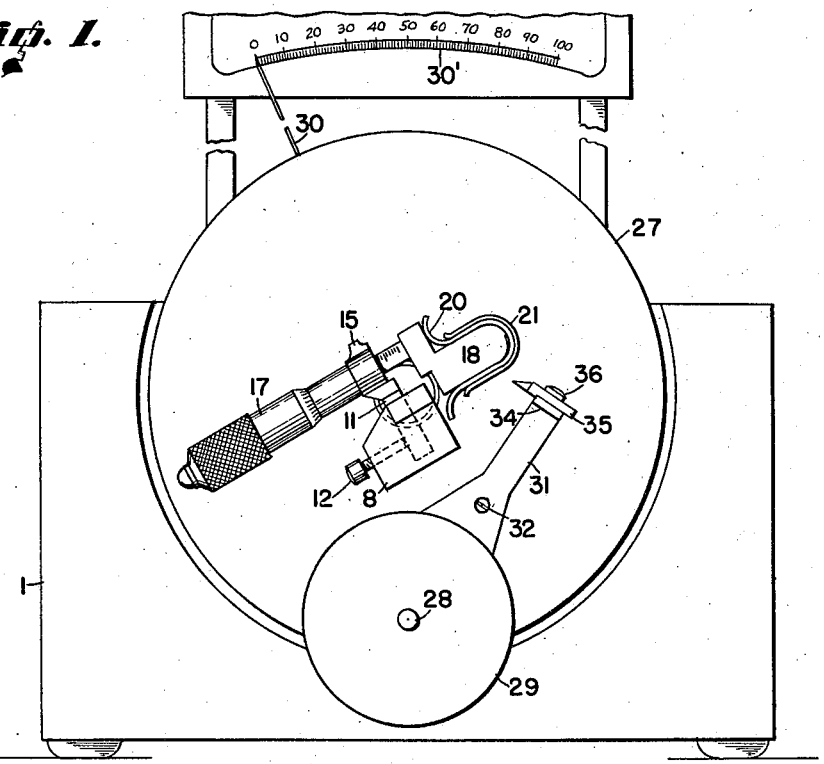
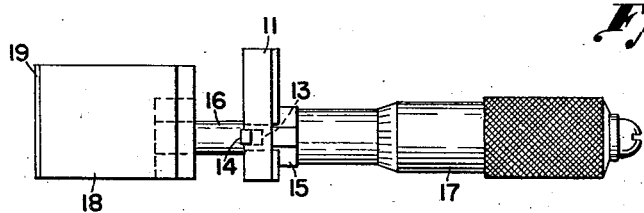
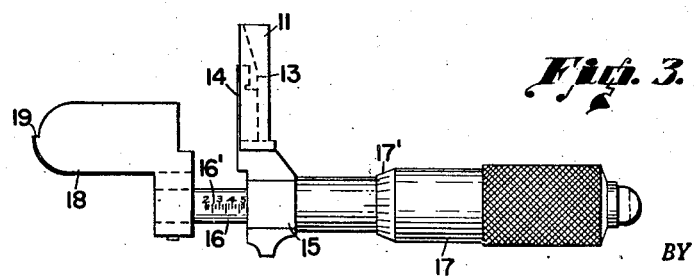
INVENTOR.
C. W. MANN
BY H. N. Foss
L. M. Mantell
ATTORNEY

INVENTOR.
C. W. MANN

Jan. 11, 1949.    C. W. MANN    2,458,953
APPARATUS AND METHOD FOR DETERMINING
THE SCUFF RESISTANCE OF LEATHER
Filed Feb. 24, 1947    3 Sheets-Sheet 3

INVENTOR.
C. W. MANN
BY
*H. N. Foss*
*L. M. Mantell*
ATTORNEY

Patented Jan. 11, 1949

2,458,953

UNITED STATES PATENT OFFICE 2,458,953

APPARATUS AND METHOD FOR DETERMINING THE SCUFF RESISTANCE OF LEATHER

Charles W. Mann, Silver Spring, Md., assignor to the United States of America as represented by the Secretary of Agriculture Application February 24, 1947, Serial No. 730,578

10 Claims. (Cl. 73—7)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to an apparatus and a method for determining physical characteristics of leather and like materials. It is particularly directed to expeditious determination of the scuff resistance of leather.

In its preferred form the apparatus comprises a specimen holder mounted for rotation about a horizontal axis, a weighted pendulum mounted for independent rotation about the same axis, a scuffing or abrading tool mounted upon the pendulum or upon an arm fixedly attached to the pendulum, adjusting and measuring means to set the radial overlap between the surface of the specimen and the edge of the scuffing tool to produce the desired depth of scuff, operating means to turn the specimen holder at a slow constant angular velocity, and a force indicating scale and a pointer operated by the deflection of the pendulum weight from its lowest point as the tool scuffs through the leather overlap.

In the drawings:

Figure 1 is a face view of the apparatus, with crankshaft and gears removed;

Figure 2 is a view of the specimen holder;

Figure 3 is a front view of the specimen holder of Figure 2;

Figure 4:
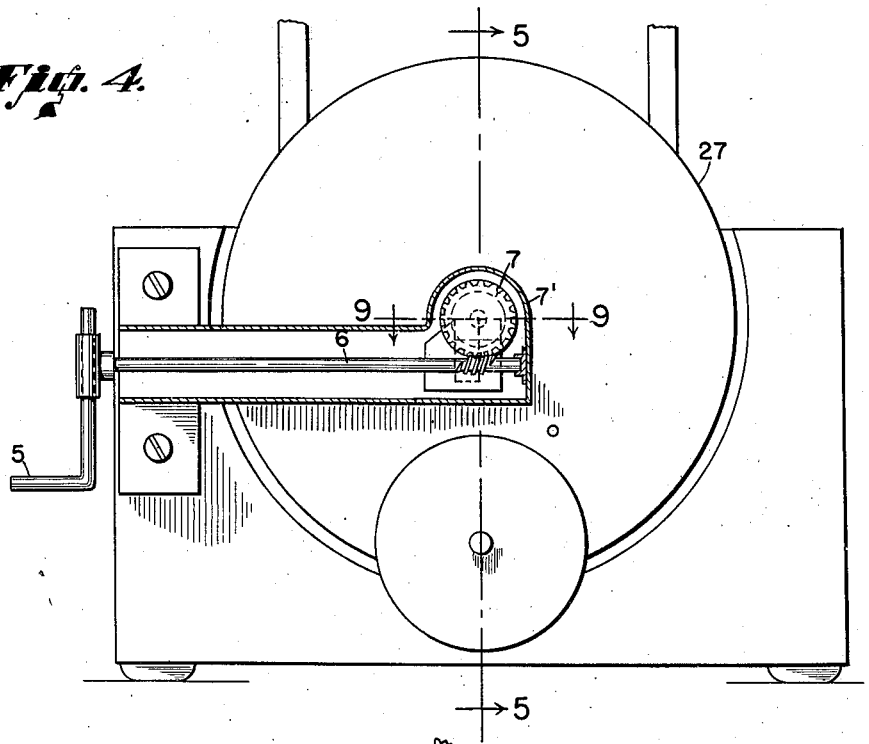
Figure 4 is a face view of the apparatus showing the hand crank and gears in place, other parts being removed.
Figure 5:
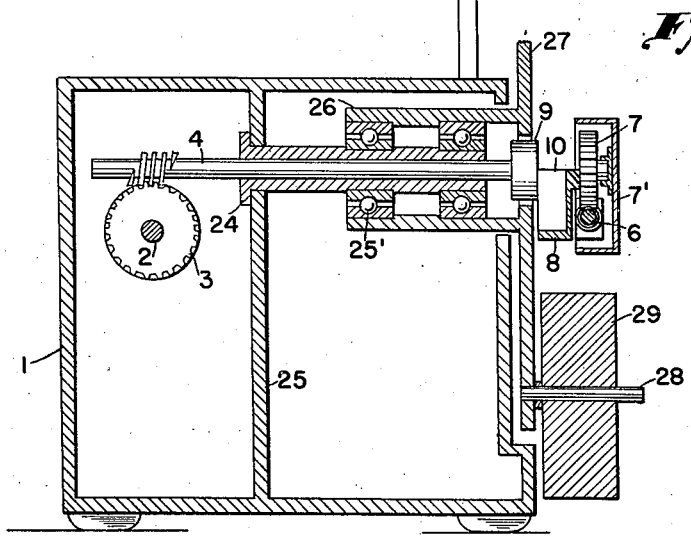
Figure 5 is a cross-sectional view.

The apparatus comprises a casing 1 containing an electric motor-operated shaft 2 (Fig. 5) and reduction gear 3, which gear turns shaft 4 at slow constant speed, for example, at 0.2 R. P. M. The shaft may also be operated by handcrank 5 through worm rod 6 and gear 7 in casing 7'. The gear 7 is welded or otherwise rigidly attached to block 8 (Fig. 5). Block 8 is rigidly connected to flange plate 9, fixed upon the end of the shaft 4.

Block 8 has a slot at 10 in which the extension bar 11 is supported. Bar 11 is grooved at 13, in which groove is held a flange 14, rigidly attached to micrometer caliper head 15. The outer face of the flange 14 projects above the corresponding face of the bar 11, the groove depth being less than that of flange. Set screw 12 therefore fastens both extension bar 11 and flange 14 in place in slot 10. Micrometer head 15 supports the spindle 16 which is adjustable in position by turning rotatable piece 17. Stock parts of a standard inside micrometer caliper may be used, such as those of Brown and Sharpe Manufacturing Company, No. 250. Spindle 16 moves longitudinally in the head 15, but does not rotate, preferably. Scales 16' and 17' on 16 and 17 are provided for accurate determination of the position of the leather specimen.

Figure 6:
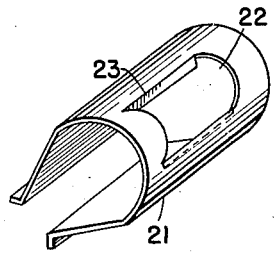
Figure 6 is a view of the specimen clamp.
Figure 7:
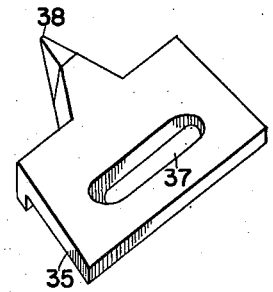
Figure 7 is a top view of the scuffing tool.
Figure 8:
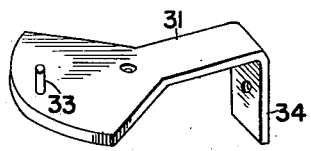
Figure 8 is a view of the support arm for the scuffing tool.
Figure 9:
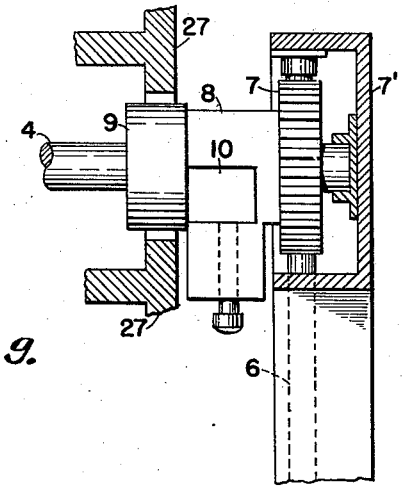
Figure 9 is a top view of the pivoted supporting block for the specimen supporting arm.

Rigidly attached to the other end of the spindle 16 is a specimen support 18 having a curved end of roughly semi-cylindrical shape. As shown in Figure 3, the curved end is provided with a projection 19 extending transversely to the axis of the spindle, and parallel to the shaft 4 when assembled. The purpose of this projection is to cause the surface of the specimen to impact the blade at such an angle as to produce a scuffing cut. The leather specimen 20 is held in position by spring clamp 21 which has a curved portion to fit on the curved end of the specimen support 18. The curved portion is cut out at 22 to expose a portion of the leather specimen. As shown in Figure 6 one edge of the cut-out portion or aperture is provided with slightly depressed projecting tongue 23. When assembled the tongue is preferably a short distance below the projection 19, in Figure 1.

The pendulum 27—29 turns independently of, but coaxially with, the specimen support arm. The rotating shaft 4 carries the work or specimen support arm, comprising elements 11, 15, 16, 17, and so forth. Shaft 4 is supported in a fixed bushing 24 which is attached to and supported in an opening in wall 25 (Fig. 5). Mounted on bushing 24, by means of ball bearings 25', is a hollow spindle 26. To the spindle is attached a pendulum disc 27, which is provided with one or more projecting pins 28 serving as supports for one or more removable weights 29. Attached to the upper part of the disc 27 is a pointer 30 which moves over scale 30'.

The tool support consists of a bracket arm 31 rigidly fixed upon disc 27 by means of screw 32 and pin 33. Flange 34, on arm 31, extends forward from the face of the disc, at a right angle thereto. Scuffing tool 35 is mounted upon flange 34 by tightening one or more screws 36 in slot 37. The knife is therefore adjustable in position in a direction parallel to the shaft 4. The edge 38 is sharpened and is of standardized width, one thirty-second of an inch, for example.

When the apparatus is assembled the specimen support and the scuffing blade lie in the same plane of rotation and the distance between the specimen support and the tip of the scuffing blade can be regulated by using the micrometer mechanism to move the specimen support radially of its axis of rotation.

The operation of the apparatus is as follows:

A piece of leather to be tested is placed over the free end of the specimen support and fastened firmly in position with the clamp.

The crank is then used to rotate the specimen support until it faces the scuffing blade. By means of the micrometer mechanism the specimen support is then positioned so that the tip of the blade nearly touches the specimen, the crank being turned until the distance between specimen and blade is at the minimum. The micrometer is then set so that the blade just touches the surface of the leather. The specimen support is then turned counter-clockwise to lift it out of alignment with the blade. The micrometer mechanism is then adjusted to produce the desired depth of scuff, for example, 0.010 to 0.025 inch. The specimen support is then rotated clockwise by means of the motor drive at a constant speed of about 0.2 R. P. M., thereby bringing the outer portion of the specimen in contact with the tip of the scuffing blade and causing deflection of the pendulum system. The scuff resistance of the leather is indicated by the maximum load registered by the pointer before the blade scuffs through the specimen, and the pendulum system returns to its initial position.

As stated above, the scuffing blade is provided with means for adjusting its position in the direction parallel to the axis of rotation of the pendulum system. Such an adjustment of the blade permits several scuff measurements to be made without removing the specimen from the holder.

The fixed load scale is preferably graduated in percent of total force corresponding to the force developed by a 90 degree swing of the pendulum system. This total force is a function of the weight used as the bob of the pendulum and can be varied by using a series of detachable weights. The force bearing upon the specimen through the scuffing blade is also a function of the distance between the axis of rotation of the specimen holder and the tip of the scuffing blade. The weights attached to the pendulum may be calibrated in inch-pounds.

Having thus described my invention, I claim:

1. An apparatus for determining the scuff resistance of material such as leather, comprising a scuffing-tool support means including a pendulum; means for fastening the scuffing tool to the pendulum; specimen-holder means for the material being tested, which holder is mounted for independent rotation about an axis parallel to that of the pendulum, the specimen-holder means including a work arm carrying a specimen support, means for fastening the material on the specimen support, and means for moving the specimen support transversely to the axis of rotation of the specimen holder to adjust the radial distance between the surface of the material and the axis of rotation of the scuffing-tool support and to pre-set the radial overlap between the surface of the material and the cutting edge of the scuffing tool; means for turning the specimen holder through an arc; and means for indicating the displacement of the pendulum as the cutting tool scuffs through the material.

2. The apparatus defined in claim 1 in which the support means and the holder means are co-axially pivoted.

3. The apparatus defined in claim 2 in which the fastening means for the scuffing tool is adjustable to permit adjustment of the position of the tool longitudinally to the axis of the pendulum.

4. The apparatus of claim 2 in which the operating means includes power-driven means for turning the material holder at constant angular velocity.

5. The apparatus of claim 2 in which the work arm includes a head, a movable spindle supported at one end by the head, a specimen support attached to the other end of the spindle, means to move the spindle transversely to the axis of rotation of the work arm, and length measuring indicia on the spindle.

6. The apparatus of claim 5 in which the head is provided with a rigidly affixed flange, means for removably attaching this flange to the axis of the pivoted holder.

7. The apparatus of claim 1 in which the specimen holder means and the tool support are coaxially pivoted, and the specimen support is provided with an arcuate end, the means for fastening the specimen material comprising a clamp having an apertured arcuate portion fitting upon the said arcuate end.

8. The apparatus of claim 7 in which the arcuate end of the specimen support is provided with a peripheral projection extending longitudinally to the axis of rotation of the work arm.

9. A method of indicating the force required to scuff material, comprising mounting the material for rotation about a horizontal axis, mounting a scuffing tool for independent rotation about the same axis, setting the radial overlap between the surface of the material and the cutting edge of the tool, weighting the tool, turning the material about the horizontal axis at a slow speed which minimizes the effect of impact, causing the turning surface of the material to engage and turn the weighted scuffing tool about its horizontal pivot, and determining the force required to scuff through the preset depth of leather by indicating the maximum deflection of the weighted scuffing tool.

10. In an apparatus for determining the scuff resistance of material such as leather, the sub-combination comprising a specimen holder mounted for rotation about a horizontal axis, a weighted pendulum mounted for independent rotation about the same axis, a scuffing tool mounted by the pendulum, adjusting and measuring means to pre-set the radial overlap between the surface of the specimen material and the cutting edge of the scuffing tool to produce the desired depth of scuff.

CHARLES W. MANN.

REFERENCES CITED

The following references are of record in the file of this patent:

UNITED STATES PATENTS

| Number | Name | Date |
|---|---|---|
| 1,184,035 | Scott | May 23, 1916 |
| 2,280,483 | Gardner | Apr. 21, 1942 |
| 2,329,541 | Kuehni | Sept. 14, 1943 |
| 2,360,639 | Asimow et al. | Oct. 17, 1944 |

FOREIGN PATENTS

| Number | Country | Date |
|---|---|---|
| 450,880 | Great Britain | July 27, 1936 |